(12) United States Patent
Hashimoto (10) Patent No.: US 6,775,416 B1
(45) Date of Patent: Aug. 10, 2004

(54) SYSTEM AND METHOD FOR INSERTING INFORMATION IN DCT COEFFICIENT DOMAIN

(75) Inventor: Masahiro Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 09/602,229

(22) Filed: Jun. 23, 2000

(30) Foreign Application Priority Data

Jun. 24, 1999 (JP) .......................................... 11-178538

(51) Int. Cl.[7] .............................. G06K 9/36; G06K 9/46
(52) U.S. Cl. ...................... 382/250; 382/239; 382/246
(58) Field of Search ................................ 382/250, 100, 382/235, 239, 245, 246, 251; 348/404.1, 419.1, 420.1; 375/240.02, 240.2, 240.23

(56) References Cited

U.S. PATENT DOCUMENTS

| 6,037,984 | A | * | 3/2000 | Isnardi et al. .......... 375/240.21 |
| 6,192,138 | B1 | * | 2/2001 | Yamadaji .................... 382/100 |
| 6,208,745 | B1 | * | 3/2001 | Florencio et al. ........... 382/100 |
| 6,373,960 | B1 | * | 4/2002 | Conover et al. ............ 382/100 |

FOREIGN PATENT DOCUMENTS

| JP | H09-191394 | 7/1997 |
| JP | 10-178642 | 6/1998 |
| JP | H10-276321 | 10/1998 |
| JP | H11-008753 | 1/1999 |
| JP | H11-098479 | 4/1999 |
| JP | H11-317859 | 11/1999 |
| WO | WO 99/01980 | 1/1999 |

* cited by examiner

Primary Examiner—Phuoc Tran
(74) Attorney, Agent, or Firm—Scully, Scott, Murphy & Presser

(57) ABSTRACT

A system for inserting an increased amount of information into DCT coefficients generated in blocks from image data is disclosed. Additional information is first inserted into input DCT coefficients in a block by changing at least one DCT coefficient of the input DCT coefficients to produce changed DCT coefficients. A level of one DCT coefficient selected from the changed DCT coefficients in the block is corrected to produce corrected DCT coefficients. The one DCT coefficient is selected so that a total code length of codes generated from the corrected DCT coefficients is equal to an original total code length of codes generated from the input DCT coefficients in the block.

10 Claims, 7 Drawing Sheets

FIG. 3

→ HORIZONTAL SPACE FREG. fH

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

↓ VERTICAL SPACE FREQ. fV

FIG. 4

| VARIABLE-LENGTH CODE | RUN | LEVEL |
|---|---|---|
| 10 | END OF BLOCK | |
| 1s | 0 | 1 |
| 11s | 0 | 1 |
| 011s | 1 | 1 |
| 0100s | 0 | 2 |
| 0101s | 2 | 1 |
| 0010 1s | 0 | 3 |
| 0011 1s | 3 | 1 |
| 0011 0s | 4 | 1 |
| 0001 10s | 1 | 2 |
| 0001 11s | 5 | 1 |
| 0001 01s | 6 | 1 |
| 0001 00s | 7 | 1 |
| 0000 110s | 0 | 4 |
| 0000 100s | 2 | 2 |
| 0000 111s | 8 | 1 |
| 0000 101s | 9 | 1 |
| 0000 01 | ESCAPE | |
| 0010 0110s | 0 | 5 |
| 0010 0001s | 0 | 6 |
| : | | |
| : | | |

FIG. 5

| 15 | 7 | 2 | 0 | 0 | 0 | · | · |
|----|---|---|---|---|---|---|---|
| 5  | 0 | 0 | 3 | · | · | · | · |
| 3  | 0 | 2 | · | · | · | · | · |
| 0  | 1 | · | · | · | · | · | 0 |
| 0  | · | · | · | · | · | 1 | 0 |
| ·  | · | · | · | · | 0 | 2 | 0 |
| ·  | · | · | · | 0 | 0 | 0 | 0 |
| ·  | · | · | 0 | 0 | 0 | 0 | 0 |

INSERTION OF INFORMATION →

| 15 | 7 | 2 | 0 | 0 | 2 | · | · |
|----|---|---|---|---|---|---|---|
| 6  | 0 | 0 | 0 | · | · | · | · |
| 3  | 0 | 3 | · | · | · | · | · |
| 0  | 1 | · | · | · | · | · | 0 |
| 0  | · | · | · | · | · | 1 | 0 |
| ·  | · | · | · | · | 0 | 1 | 0 |
| ·  | · | · | · | 0 | 0 | 0 | 0 |
| ·  | · | · | 0 | 0 | 0 | 0 | 0 |

SYSTEM AND METHOD FOR INSERTING INFORMATION IN DCT COEFFICIENT DOMAIN

BACKGROUND OF THE INVENTION

1. Field of the Invention

The present invention relates to techniques for inserting additional information into discrete cosine transform (DCT) coefficient data, which is intermediate data in a digital image encoding system conforming to compression standards such as MPEG, JPEG, H.261. or the like.

2. Description of the Prior Art

With wide-spreading digital satellite broadcasting, Internet transmission and DVD (Digital Video Disk), etc. in recent years, digital images are becoming easily accessible to users. Since the quality of digital images does not deteriorate when they are copied, securing their copyrights is an important issue. As means for implementing protection for copyrights, there has been proposed a technique of adding copyright information or the like into the DCT coefficient domain of digital image (see Japanese Patent Application Unexamined Publication No. 10-178642).

A typical example of such a conventional information inserting system will be described briefly with reference to FIG. 9.

Figure 9:
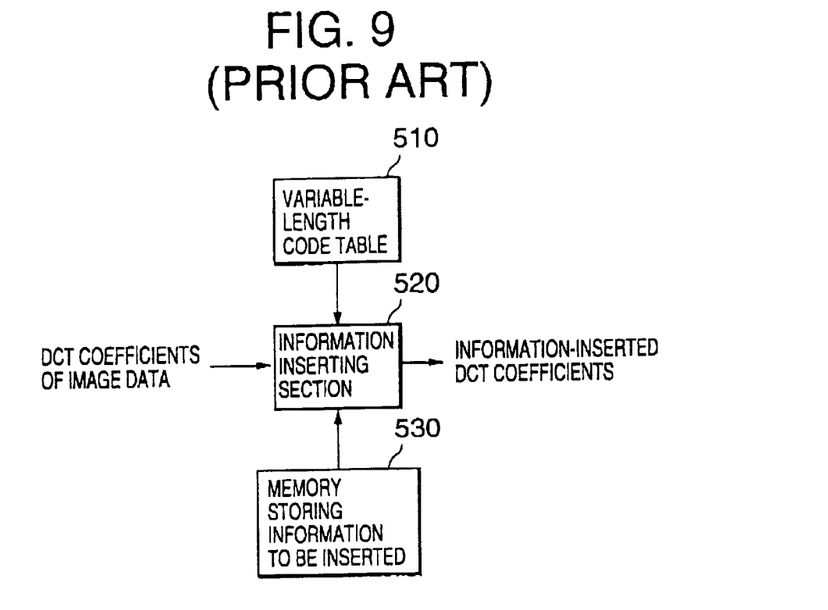
FIG. 9 is a block diagram showing a configuration of a conventional system for inserting information into DCT coefficient data.

Referring to FIG. 9, an information inserting section 520 receives information to be inserted from an insertion information memory 530 and inserts the information into DCT coefficients of image data. The information is inserted with reference to a variable-length code table 510. More specifically, the variable-length code table 510 is searched for a combination of level and zero-run length (hereinafter simply referred to as "run length"), that allows the length of the code to be kept constant when the level is changed. Therefore, the information can be inserted by only changing the level of that combination.

Figure 10:
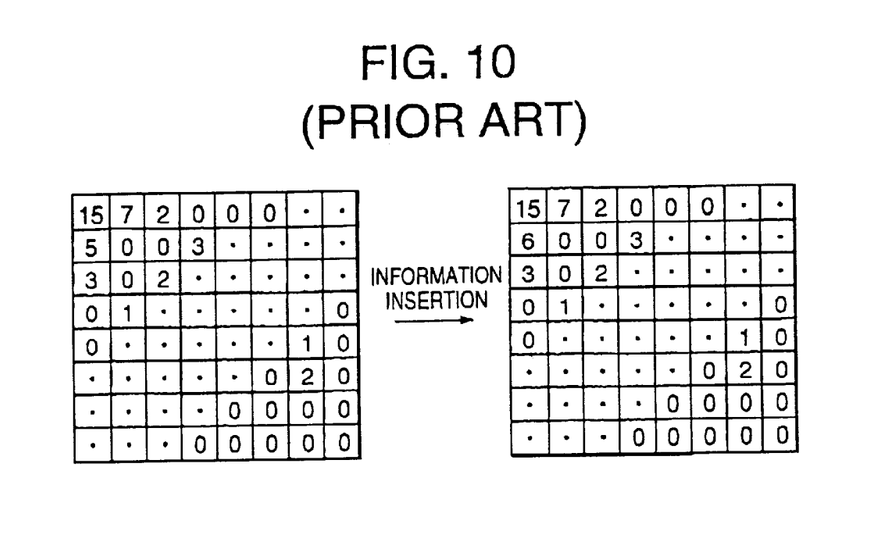
FIG. 10 is a diagram illustrating DCT coefficient sequences before and after insertion of information for explaining the conventional information inserting system.

FIG. 10 is an example of insertion of certain information into DCT coefficients of a block of image data. In this example, a one-dimensional data stream obtained by scanning the DCT coefficients in zigzag order is represented as follows:

before the information is inserted, (15,7,5,3,0,2,0,0,0,0,0,1,2,3,0, ...
0,0,0,1,0,0,2,0,0,0,0,0,0,0,0); and after the information has been inserted, (15,7,6,3,0,2,0,0,0,0,0,1,2,3,0, ...
0,0,0,1,0,0,2,0,0,0,0,0,0,0,0).

Insertion of the information in this example is performed by changing the level of the third coefficient from 5 to 6. The code length after Huffman coding does not change before and after insertion of the information. That is, the code length of a code corresponding to a combination of run length and level (run_length=0, level=5) is 9 and that corresponding to (run_length=0, level=6) is also 9. Therefore, a change from (run_length=0, level=5) to (run_length=0, level=6) of the third coefficient does not cause any change in code length, remaining 9 bits.

Such a conventional information inserting method, however, has a problem of allowing only a limited amount of information to be inserted. This is because information is only inserted by finding a combination (run length, level) at which the code length does not vary though the level of a DCT coefficient is changed and then changing only the level of a found combination.

SUMMARY OF THE INVENTION

It is an object of the present invention to provide a system and method allowing an increased amount of information to be inserted into DCT coefficient data.

According to the present invention, a system for inserting additional information in DCT coefficients by referring to a variable-length code table, wherein the DCT coefficients are generated in blocks from image data, includes an information inserting section for inserting additional information into input DCT coefficients in a block by changing at least one DCT coefficient of the input DCT coefficients to produce changed DCT coefficients; and a total code length restoring section for correcting a level of one DCT coefficient selected from the changed DCT coefficients in the block to produce corrected DCT coefficients by referring to the variable-length code table, wherein the one DCT coefficient is selected so that a total code length of codes generated from the corrected DCT coefficients is equal to an original total code length of codes generated from the input DCT coefficients in the block.

The total code length restoring section preferably includes a difference calculator for calculating a total code length difference between the original total code length and a total code length of codes generated from the changed DCT coefficients in the block; a target code length calculator for calculating a target code length for a non-zero DCT coefficient sequentially selected from the changed DCT coefficients based on a difference between the total code length difference and a current code length of the non-zero DCT coefficient; and a level corrector for correcting a level of the non-zero DCT coefficient to produce corrected DCT coefficients when a corrected code length of a code generated from a combination of a zero-run length and a corrected level of the non-zero DCT coefficient substantially matches the target code length.

The level corrector may include a level candidate calculator for calculating a level candidate of the non-zero DCT coefficient based on a current level of the non-zero DCT coefficient; a determiner for determining whether a corrected code length of a code generated from a combination of a zero-run length and the level candidate of the non-zero DCT coefficient substantially matches the target code length; and a corrector for correcting a level of the non-zero DCT coefficient to the level candidate when the corrected code length matches the target code length. The level candidate calculator may include a level range limiter for limiting a level range of the non-zero DCT coefficient based on the current level of the non-zero DCT coefficient; and a candidate generator for generating a level candidate within the level range.

The level corrector may include a level candidate calculator for calculating a level candidate of the non-zero DCT coefficient based on the target code length and a zero-run length of the non-zero DCT coefficient; a determiner for determining whether a corrected code length of a code generated from a combination of the zero-run length and the level candidate of the non-zero DCT coefficient substantially matches the target code length; and a corrector for correcting a level of the non-zero DCT coefficient to the level candidate when the corrected code length matches the target code length. The level candidate calculator may include a candidate generator for generating a level candidate based on the target code length and a zero-run length of the non-zero DCT coefficient; a level range limiter for limiting a level range of the non-zero DCT coefficient, wherein the level range is limited by a maximum level and a minimum level;

DETAILED DESCRIPTION OF THE PREFERRED EMBODIMENTS

System Configuration

Figure 1:
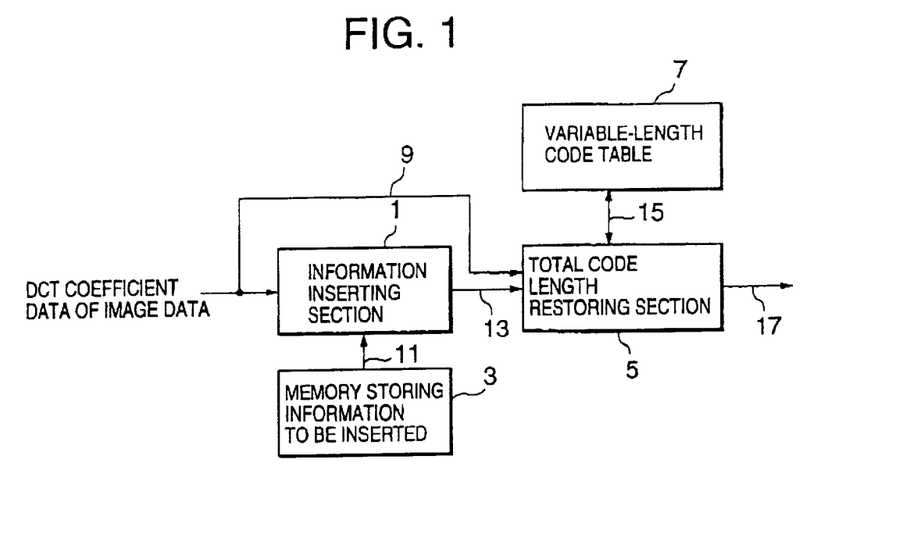
FIG. 1 is a schematic block diagram showing a configuration of a system for inserting information into DCT coefficient data according to the present invention.

Referring to FIG. 1, an information inserting section 1 receives DCT coefficient data 9 of image data from outside and information 11 to be inserted from an insertion information memory 3. The information inserting section 1 inserts the information 11 into the DCT coefficient data 9 and outputs intermediate DCT coefficient data 13 to a total code length restoring section 5.

The total code length restoring section 5 receives the DCT coefficient data 9 and the intermediate DCT coefficient data 13 from the information inserting section 1 and produces resultant DCT coefficient data 17 while referring to a variable-length code table 7. More specifically, the total code length restoring section 5 rewrites some DCT coefficients of the intermediate DCT coefficient data 13 by referring to the variable-length code table 7 so that the sum total of code lengths obtained by coding the intermediate DCT coefficient data 13 is equal to that of code lengths obtained by coding the DCT coefficient data 9. In this manner, the DCT coefficient data 17 is finally obtained.

Hereafter, assuming the input image data is MPEG-encoded image data, embodiments of the present invention will be described in detail.

Figure 2:
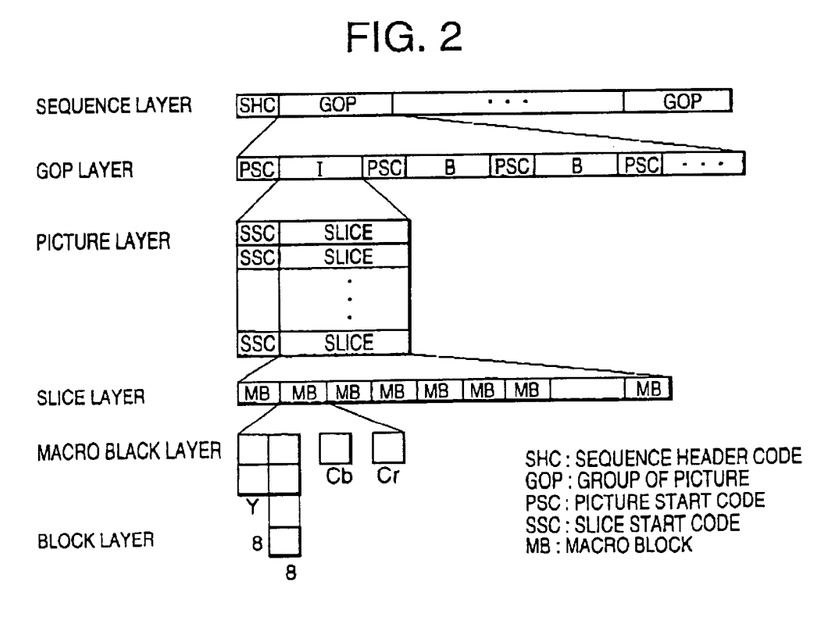
FIG. 2 illustrates a layered structure of an MPEG standard format.

As shown in FIG. 2, image data that has been compressed according to an MPEG standard has such a structure that a sequence header code SHC is followed by a sequence of GOP (group of picture). Here, data of each frame/field of an image is written in a picture layer following a picture start code (PSC). Each frame or field is encoded in one of three types of picture format. Intra-Picture (hereinafter referred to as "I picture"), Predictive Picture (hereinafter referred to as "P picture") and Bidirectionally-Predictive-Picture (hereinafter referred to as "B picture"). In the case of P picture and B picture, only a difference between a reference picture and the own picture is encoded as image data. Moreover, each picture is subdivided into blocks and each block is subjected to the discrete cosine transform (DCT). Then, the DCT coefficients are quantized with an appropriate quantizing coefficient and the quantized DCT coefficients are subjected to two-dimensional Huffman coding.

The field data of each frame is inside a macro block (MB) layer under a slice layer following a slice start code (SSC). In the case where a color difference format is 4:2:0, the field data of each frame is expressed by a total of 6 block layers, 4 block layers indicating brightness data Y and 2 block layers indicating color difference data Cb and Cr.

Variable-Length Encodidg

The following is a further explanation of variable length encoding using two-dimensional Huffman codes.

Figure 3:
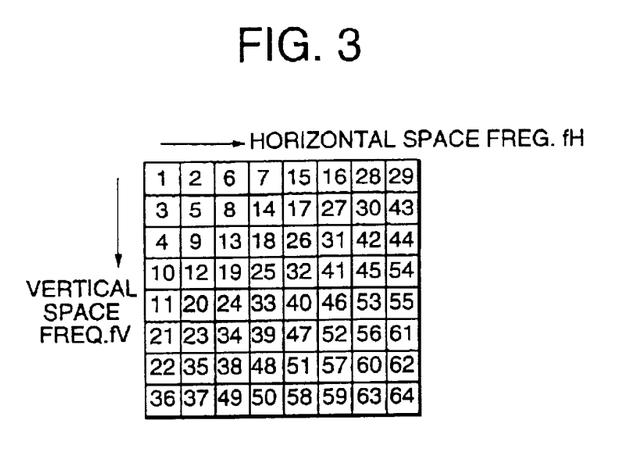
FIG. 3 illustrates a zigzag-scanning sequence.

As shown in FIG. 3, in the case of zigzag scanning, quantized DCT coefficients are scanned in a sequence of numbers and are converted to a one-dimensional sequence of 64 DCT coefficients. The position labeled with "1" in the figure expresses a DC component of the DCT domain. Horizontal space frequency increases from this position "1" rightward and vertical frequency increases from this position "1" downward. Thus, zigzag scanning virtually results in a one-dimensional sequence in order from low-frequency components to high-frequency components. For this one-dimensional sequence of 64 DCT coefficients, a non-zero coefficient amplitude (level) and a running length of preceding zero coefficients (run length) are sequentially combined except the DC component (the first component of the one-dimensional sequence). A variable length code is assigned to each of these combinations of run lengths and levels.

Figure 4:
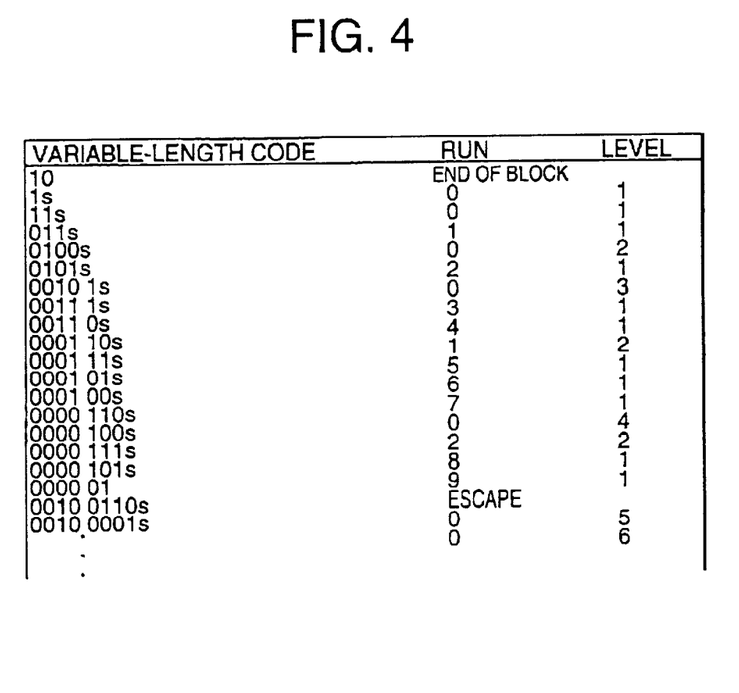
FIG. 4 is a schematic diagram showing a two-dimensional variable-length coding table.

Referring to FIG. 4, for example, a code "00100110s" is assigned to a combination of run length 0 and level 5 and a code "00100001s" is assigned to a combination of run length 0 and level 6. Here, "s" at the end of each code is a sign bit.

The variable length table 7 is configured as follows. That is, using a set of combinations of run lengths and levels in an entire DCT domain made up of 64 DCT coefficients as an information source, the probabilities of occurrence of those combinations are obtained in advance through actual measurements or probability models. Then, each code word is assigned to each combination using the obtained probabilities of occurrence of combinations according to the Huffman coding method.

When a run length and a level are input, the variable length code table 7 outputs the code length of the corresponding code. When a run length and a code length are input, the variable length code table 7 outputs the corresponding level.

Information Inserting Method

Next, a method for inserting information into DCT coefficients will be explained.

A necessary condition when inserting information is that the sum total of all code lengths when DCT coefficients are subjected to the Huffman coding does not change.

Figure 5:
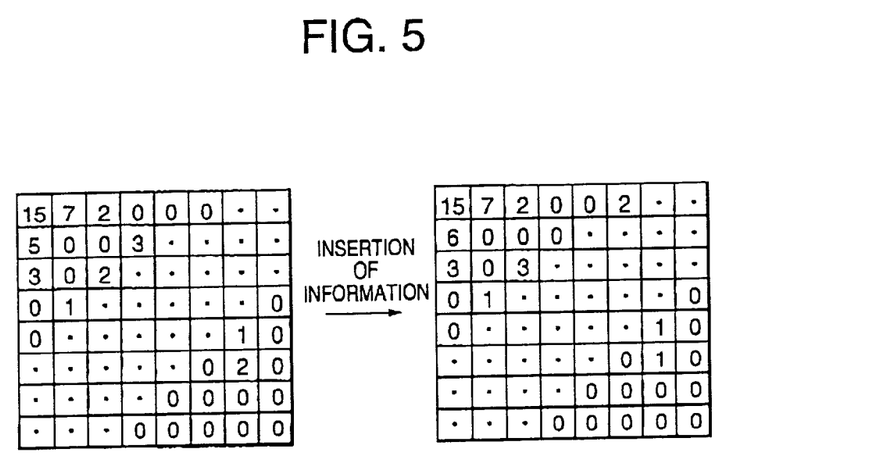
FIG. 5 is a diagram illustrating DCT coefficient sequences before and after insertion of information for explaining the present invention.

As shown in FIG. 5, in this example, a one-dimensional sequence obtained by zigzag-scanning before insertion of the information is:

(15,7,5,3,0,2,0,0,0,0,0,1,2,3,0,0, . . .
0,0,0,1,0,0,2,0,0,0,0,0,0,0), and after insertion of the information is:

(15,7,6,3,0,2,0,0,0,0,0,1,3,0,0,2, . . .
0,0,0,1,0,0,1,0,0,0,0,0,0,0).

Information in this example is inserted by changing the 3rd coefficient from 5 to 6, the 13th coefficient from 2 to 3, the 14th coefficient from 3 to 0, the 16th coefficient from 0 to 2, and the 56th coefficient from 2 to 1. The Huffman-coded code length does not change before and after inserting the information.

More specifically, the change in the 3rd coefficient causes the combination (run length 0, level 5) to change to the combination (run length 0, level 6). Since the code lengths corresponding to these combinations are both 9 as shown in FIG. 4, the code length is not changed by the change of the 3rd coefficient.

The change in the 13th coefficient causes the combination (run length 0, level 2) to change to the combination (run length 0, level 3). The code length of the code corresponding to the combination (run length 0, level 2) is 5 bits and the code length of the code corresponding to the combination (run length 0, level 3) is 6 bits (see FIG. 4). Therefore, the change of the 13th coefficient causes the code length to be increased by 1 bit.

The change in the 14th coefficient causes the combination (run length 0, level 3) to change to the combination (run length 2, level 2). The code length of the code corresponding to the combination (run length 0, level 3) is 6 bits and the code length of the code corresponding to the combination (run length 2, level 2) is 8 bits (see FIG. 4). Therefore, the change of the 14th coefficient causes the code length to be increased by 2 bits.

The change in the 56th coefficient causes the combination (run length 2, level 2) to change to the combination (run length 2, level 1). The code length of the code corresponding to the combination (run length 2, level 2) is 8 bits and the code length of the code corresponding to the combination (run length 2, level 1) is 5 bits. Therefore, the change of the 56th coefficient causes the code length to be decreased by 3 bits.

Therefore, the sum total of increments/decrements of the code length is: 0 bits+2 bits+1 bit−3 bits=0 bits, which means that the sum total of code lengths remains unchanged. This is a basic operation of the total code length restoring section 5 of FIG. 1.

Code Length Restoration

First to third embodiments of the total code length restoring section 7 will be explained in detail below.

First Embodiment

Figure 6:
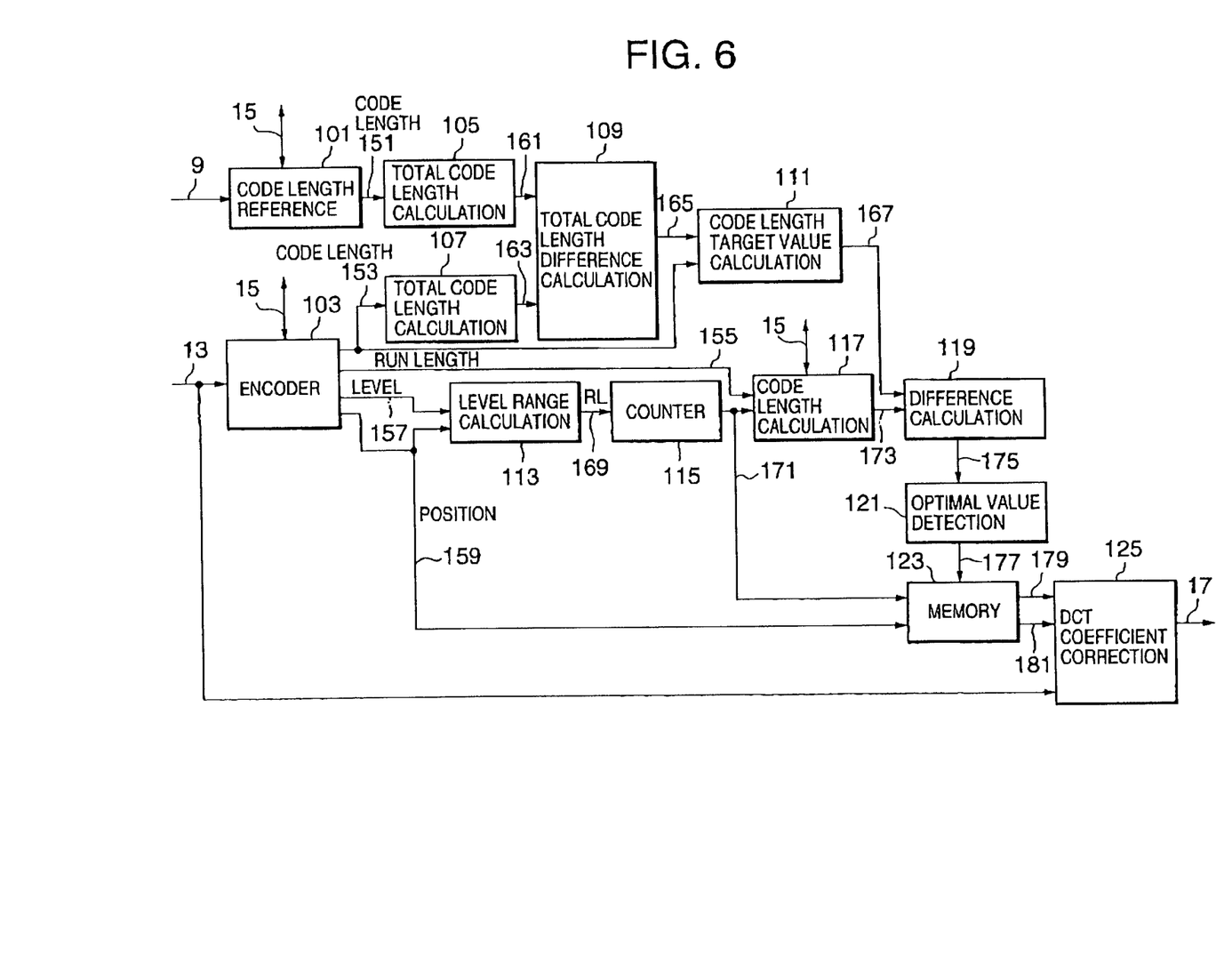
FIG. 6 is a block diagram showing a total code length restoring section according to a first embodiment of the present invention.

Referring to FIG. 6, the total code length restoring section 5 according to a first embodiment of the present invention will be described.

In FIG. 6, the total code length restoring means 5 includes a code length reference section 101, an encoder 103, a total code length calculation sections 105 and 107, a total code length difference calculation section 109, a code length target value calculation section 111, a level range calculation section 113, a counter 115, a code length reference section 117, a difference calculation section 119, an optimal value detection section 121, a memory 123, and a DCT coefficient correction section 125.

The code length reference section 101 receives the DCT coefficient data 9 before inserting information and outputs a code length signal 151 indicating the code length of an individual code produced from the DCT coefficient data 9 by referring to the variable length code table 7. The term "individual code" is defined as a code generated from a non-zero DCT coefficient and the run length preceding the non-zero DCT coefficient.

The encoder 103 receives the DCT coefficient data 13 after inserting the information from the information inserting section 1. The encoder 103, while referring to the variable length code table 7, outputs a code length signal 153 indicating the code length of an individual code produced from the DCT coefficient data 13, a run length signal 155 indicating the run length corresponding to the individual code, a level signal 157 indicating the level of the non-zero coefficient corresponding to the individual code, and a position signal 159 indicating the position of the non-zero coefficient. The term "individual code" is also defined as a code generated from a non-zero DCT coefficient and the run length preceding the non-zero DCT coefficient.

The total code length calculation section 105 receives the code length signal 151 from the code length reference section 101 and calculates a total code length signal 161 indicating the total code length for each block of the DCT coefficient data 9 before inserting the information.

The total code length calculation section 107 receives the code length signal 153 from the encoder 103 and calculates a total code length signal 163 indicating the total code length for each block of the DCT coefficient data 13 after inserting the information.

The total code length difference calculation section 109 receives the respective total code length signals 161 and 163 from the total code length calculation sections 105 and 107. The total code length difference calculation section 109 calculates a total code length difference signal 165 indicating a difference between the per-block total code length before inserting the information and the per-block total code length after inserting the information. It is the difference that should be compensated for.

The code length target value calculation section 111 receives the code length signal 153 and the total code length difference signal 165 and calculates a code length target signal 167 indicating a code length target value by subtracting the difference indicated by the total code length difference signal 165 from the code length indicated by the code length signal 153. The total code length is restored when the code length of a code generated from the level of one non-zero coefficient after correction and the corresponding run length (not corrected) becomes equal to the code length target value. Code length target values are calculated successively for all non-zero coefficients. However, not the levels of all non-zero coefficients but the level of one non-zero coefficient is corrected as a whole in the total code length restoring section 5.

The level range calculation section 113 receives the level signal 157 and the position signal 159 from the encoder 103 and outputs a level range signal 169 indicating minimum and maximum values of a level variation range that does not produce any deterioration in the quality of an image. The level signal 157 is necessary to provide references for the maximum and minimum values. The position signal 159 is necessary to change the level variation range based on the space frequency. If the level variation range does not depend on space frequency, it is not necessary to input the position signal 159 to the level range calculation section 113.

The counter 115 receives the level range signal 169 from the level range calculation section 113 and outputs a count signal 171 indicating a count value obtained by sequentially counting from the minimum value to the maximum value. A count value represents a level candidate after correction.

The code length reference section 117 receives the run length signal 155 and the count signal 171 and, by referring to the variable length code table 7, outputs a code length signal 173 indicating the code length corresponding to a combination of the run length indicated by the run length signal 155 and the level candidate indicated by the count signal 171. That is, the code length signal 173 indicates the code length corresponding to each candidate of a level correction value.

The difference calculation section 119 receives the target value signal 167 and the code length signal 173 and outputs a difference signal 175 indicating a difference between a code length target value indicated by the target value signal 167 and a code length indicated by the code length signal 173. The total code length is restored by correcting the level of a non-zero coefficient in question to the level candidate that is indicated by the counter 115 when the difference indicated by the difference signal 175 is zero.

The optimal value detection section 121 receives the difference signal 175 from the difference calculation section 119 and outputs a write enable signal 177, which becomes active when a minimum value of the absolute value of the difference indicated by the difference signal 175 is updated. The optimal value detection section 121 can also be designed to make a write enable signal 177 active when the difference indicated by the difference signal 175 becomes zero and not to make it active even if the difference indicated by the difference signal 175 becomes zero thereafter.

The memory 123 receives the position signal 159, the count signal 171, and the write enable signal 177, stores the position indicated by the position signal 159 and the level indicated by the count signal 171 when the write enable signal 177 becomes active. Then, the memory 123 outputs a level signal 179 indicating the level after correction of a non-zero coefficient to be corrected and a position signal 181 indicating the position of the non-zero coefficient to be corrected when the counting operation of the counter 115 for all non-zero coefficients in the block has been completed.

The DCT coefficient correction section 125 receives the DCT coefficient data 13, the level signal 179, and the position signal 181. The DCT coefficient correction section 125 corrects the level of the DCT coefficient located at the position indicated by the position signal 181 among the DCT coefficients 13 to the level indicated by the level signal 179. Therefore, the DCT coefficient correction section 125 outputs restored DCT coefficient data 17 indicating all DCT coefficients about the block, that is, all DCT coefficients after the total code length has been restored.

When the optimal value detection section 121 has not detected any zero from the difference signal 175, then it is also possible to broaden the level variation range determined by the level range calculation section 113 and make a retry. It is also possible to output an error signal without making any retry. However, no retry or error signal is necessary depending on the application.

Second Embodiment

Figure 7:
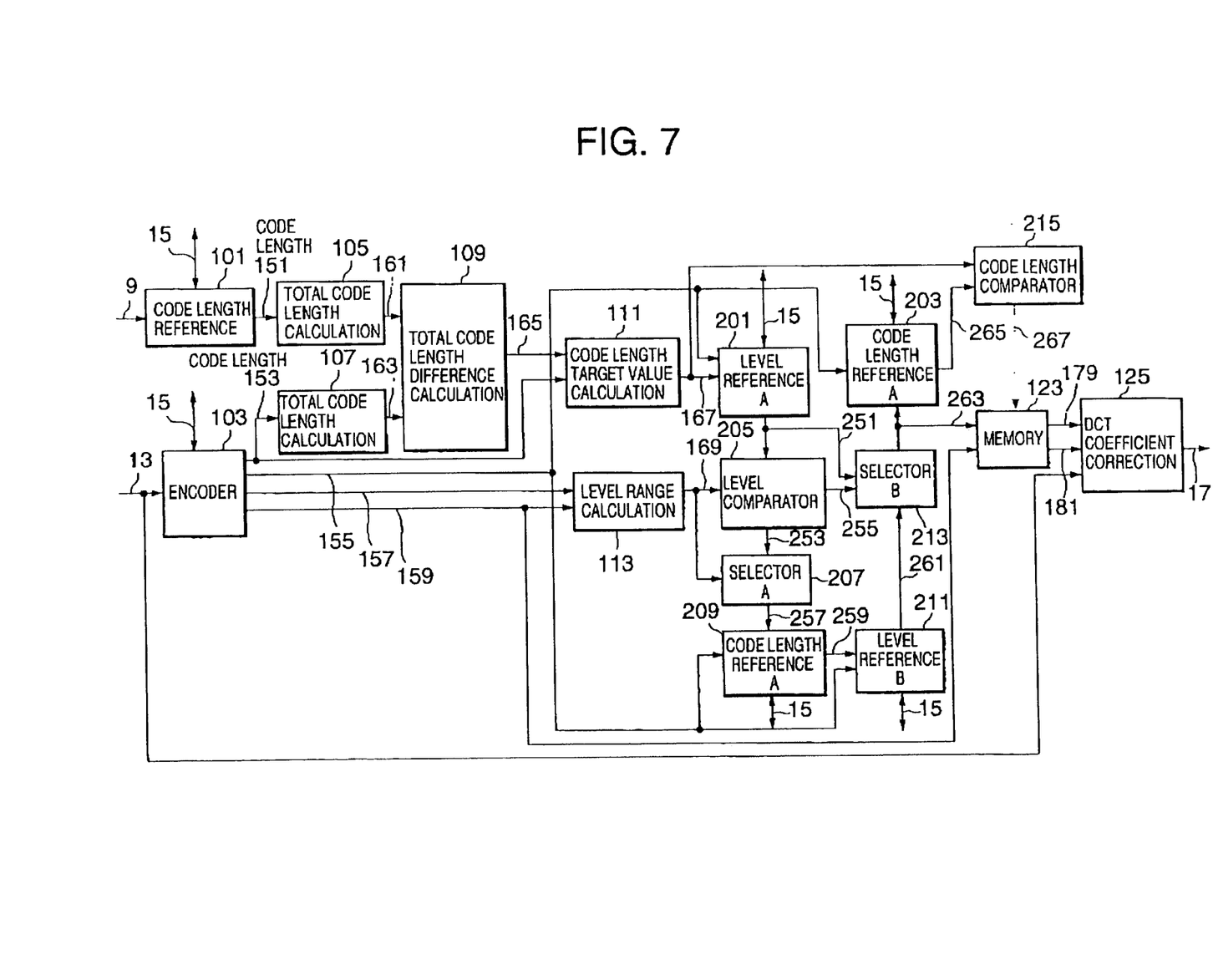
FIG. 7 is a block diagram showing a total code length restoring section according to a second embodiment of the present invention.

Referring to FIG. 7, the total code length restoring section 5 according to a second embodiment of the present invention will be described.

In FIG. 7, the total code length restoring means 5 includes a code length reference section 101, an encoder 103, a total code length calculation sections 105 and 107, a total code length difference calculation section 109, a code length target value calculation section 111 a level range calculation section 113, a level reference section 201, a code length reference section 203, a level comparator 205, a selector 207, a code length reference section 209, a level reference section 211, a selector 213, and a code length comparator 215, a memory 123, and a DCT coefficient correction section 125.

The code length reference section 101 receives the DCT coefficient data 9 before inserting information and outputs a code length signal 151 indicating the code length of an individual code produced from the DCT coefficient data 9 by referring to the variable length code table 7.

The encoder 103 receives the DCT coefficient data 13 after inserting the information from the information inserting section 1. The encoder 103, while referring to the variable length code table 7, outputs a code length signal 153 indicating the code length of an individual code produced from the DCT coefficient data 13, a run length signal 155 indicating the run length corresponding to the individual code, a level signal 157 indicating the level of the non-zero coefficient corresponding to the individual code, and a position signal 159 indicating the position of the non-zero coefficient.

The total code length calculation section 105 receives the code length signal 151 from the code length reference section 101 and calculates a total code length signal 161 indicating the total code length for each block of the DCT coefficient data 9 before inserting the information.

The total code length calculation section 107 receives the code, length signal 153 from the encoder 103 and calculates a total code length signal 163 indicating the total code length for each block of the DCT coefficient data 13 after inserting the information.

The total code length difference calculation section 109 receives the respective total code length signals 161 and 163 from the total code length calculation sections 105 and 107. The total code length difference calculation section 109 calculates a total code length difference signal 165 indicating a difference between the per-block total code length before inserting the information and the per-block total code length after inserting the information.

The code length target value calculation section 111 receives the code length signal 153 and the total code length difference signal 165 and calculates a code length target signal 167 indicating a code length target value by subtracting the difference indicated by the total code length difference signal 165 from the code length indicated by the code length signal 153.

The level range calculation section 113 receives the level signal 157 and the position signal 159 from the encoder 103 and outputs a level range signal 169 indicating minimum and maximum values of a level variation range that does not produce any deterioration in the quality of an image.

The level reference section 201 receives the run length signal 155 and the code length target signal 167 and outputs a target level signal 251 indicating the target level corresponding to a combination of the run length indicated by the signal 155 and the code length target value indicated by the signal 167. If there is a plurality of target level candidates, a minimum level, maximum level or intermediate level of those target level candidates is used as the target level. When the level of one non-zero coefficient becomes the target level it means that the per-block total code length is restored.

The level comparator 205 receives the level range signal 169 and the target level signal 251 and compares the target level with a maximum value and minimum value of the level variation range. The level comparator 205 outputs selection signals 253 and 255 that vary depending on the comparison result. The fact that the target level is within the level variation range means that the image quality does not deteriorate even if a non-zero coefficient level is used as the target level.

The selector 207 receives the level range signal 169 and the selection signal 253 and outputs a signal 257 according to the selection signal 253. If the target level is greater than a maximum value of the level variation range, the signal 257 is a maximum value signal indicating the maximum value of the level variation range. If the target level is smaller than a minimum value of the level variation range, the signal 257 is a minimum value signal indicating the minimum value of the level variation range. In other cases, the signal 257 is a signal indicating an indefinite state. The reason why the signal 257 is allowed to be in the indefinite state is that the selector 213 does not select the signal 261 in that case.

The code length reference section 209 receives the run length signal 155 and the signal 257 output from the selector 207. With reference to the variable length code table 7, the code length reference section 209 outputs a code length signal 259 indicating the code length of a code corresponding to a combination of the run length indicated by the signal 155 and the level indicated by the signal 257.

The level reference section 211 receives the run length signal 155 and the code length signal 259. With reference to the variable length code table 7, the level length reference section 211 outputs a level signal 261 Indicating the level corresponding to a combination of the run length indicated by the signal 155 and the code length indicated by the signal 259 with reference to the variable length code table 7. When there is a plurality of level candidates corresponding to the combination of the run length indicated by the signal 155 and code length indicated by the signal 259, a minimum level, maximum value or intermediate value of those level candidates is used as the level. The selection rule for these candidates is the same as in the case of the level reference section 201 so as to make the match between the level reference section 201 and level reference section 211. If there is only a single level candidate corresponding to the code length indicated by the combination of the run length indicated by the signal 155 and the code length indicated by the signal 259, then the level indicated by the signal 257 is the same as that indicated by the signal 261.

The selector 207, code length reference section 209, level reference section 211 and selector 213 are provided so that the rule about the level of the level reference section 201 is also applied to the case where the level to be selected is a maximum value or minimum value output by the level range calculation section 113.

The selector 213 receives the target level signal 251, the level signal 261, and the selection signal 255 and outputs a signal 263 according to the selection signal 255. When the target level is greater than a maximum value of the level variation range and when the target level is smaller than a minimum value of the level variation range, the signal 263 is the same as the level signal 261. In other cases, the signal 263 is the same as the target level signal 251.

More specifically, when the target level is greater than the maximum value of the level variation range, the signal 263 is a level signal indicating the level according to the maximum value of the level variation range. When the target level is smaller than the minimum value of the level variation range, the signal 263 is a level signal indicating the level according to the minimum value of the level variation range. When the target level is equal to or smaller than the maximum value of the level variation range and greater than the minimum value thereof, the signal 263 is a signal indicating the target level.

The code length reference section 203 receives the run length signal 155 and the signal 263 inputted from the selector 213. With reference to the variable length code table 7, the code length reference section 203 outputs a signal 265 indicating the code length of a code corresponding to a combination of the run length indicated by the signal 155 and the level indicated by the signal 263.

The code length comparator 215 receives the code length target value signal 167 and the 265 and compares the code length target value indicated by the signal 167 with the code length indicated by the signal 265. The code length comparator 215 outputs a write enable signal 267 that becomes active when the code length target value and the code length match. Alternatively, the code length comparator 215 can also compare the code length target value indicated by the signal 167 with the code length indicated by the signal 265 and outputs a write enable signal 267 that becomes active when the absolute value of the difference of these two is updated.

The memory 123 receives the position signal 159, the signal 263 and the write enable signal 267. The memory 123 stores the position indicated by the position signal 159 and the level indicated by the signal 263 when the write enable signal 267 becomes active. When the above operation for all non-zero coefficients in the block has been completed, the memory 123 outputs a level signal 179 indicating the level after correction and a position signal 181 indicating the position of the corrected non-zero coefficient.

The DCT coefficient correction section 125 receives the DCT coefficient data 13, the level signal 179, and the position signal 181. The DCT coefficient correction section 125 corrects the level of the DCT coefficient located at the position indicated by the position signal 181 among the DCT coefficients 13 to the level indicated by the level signal 179. Therefore, the DCT coefficient correction section 125 outputs restored DCT coefficient data 17 indicating all DCT coefficients about the block, that is, all DCT coefficients after the total code length has been restored.

When the level output by the level reference section 201 is selected as the level of the non-zero coefficient to be corrected, the total code length is restored. Contrarily, when a maximum value or minimum value output by the level range calculation section 113 is selected as the level of the non-zero coefficient to be corrected, it is not guaranteed that the total code length will be restored.

However, even if a maximum value or minimum value output by the level range calculation section 113 is selected as the level of the non-zero coefficient to be corrected, there is still a possibility that the total code length may be restored. Furthermore, there is a low probability that a maximum value or minimum value output by the level range calculation section 113 will be selected as the level after correction for all non-zero coefficients.

When no match has been found in the code length comparator 215, it is also possible to make a retry by broadening the level variation range determined by the level range calculation section 113. It is also possible to output an error signal without making any retry. However, some applications require neither retry nor error signal.

Third Embodiment

Figure 8:
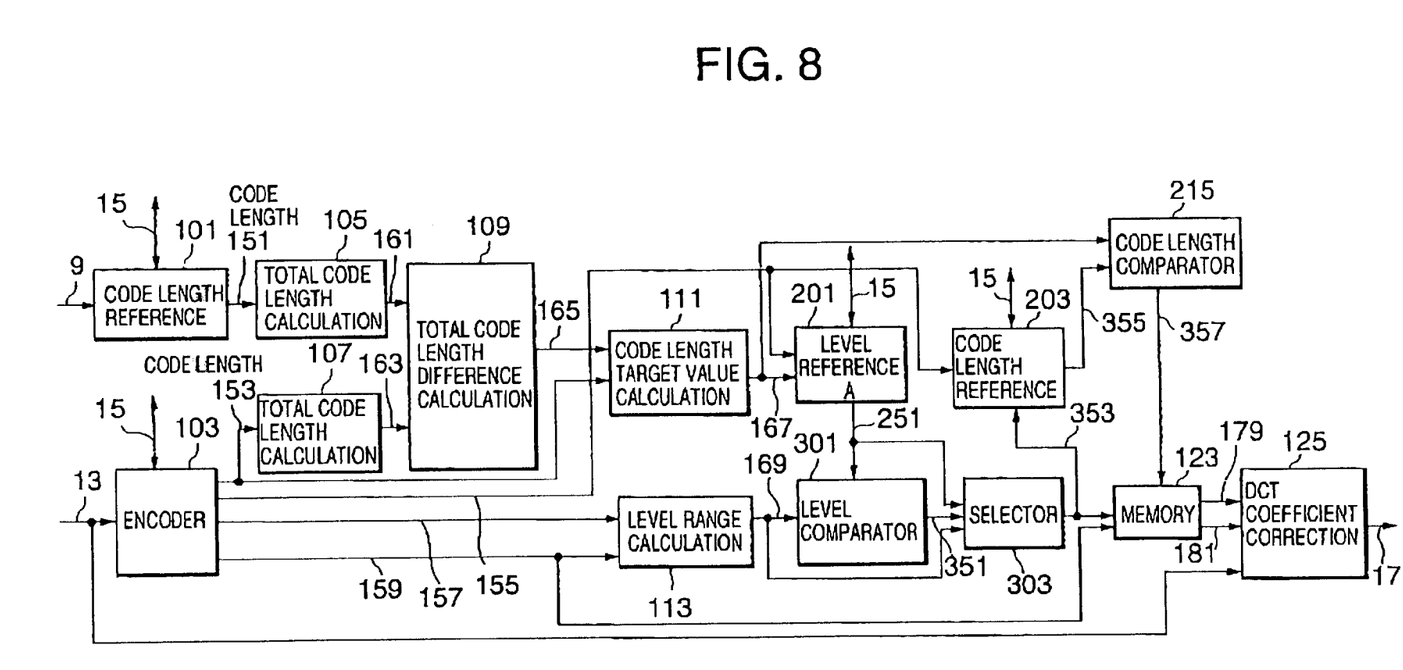
FIG. 8 is a block diagram showing a total code length restoring section according to a third embodiment of the present invention.

Referring to FIG. 8, the total code length restoring section 5 according to a third embodiment of the present invention will be described.

The total code length restoring section 5 according to the third embodiment removes the selector 207, code length reference section 209, level reference section 211, and selector 213 from the circuit configuration of the second embodiment as shown in FIG. 7. Therefore, the rule about the level output by the level reference section 201 is prevented from applying to the case where the level selected after correction is a maximum value or minimum value output by the level range calculation section 113.

In FIG. 8, the total code length restoring means 5 includes a code length reference section 101, an encoder 103, a total code length calculation sections 105 and 107, a total code length difference calculation section 109, a code length target value calculation section 111, a level range calculation section 113, a level reference section 201, a level comparator 301, a code length reference section 203, a selector 303, a code length comparator 215, a memory 123, and a DCT coefficient correction section 125.

The code length reference section 101 receives the DCT coefficient data 9 before inserting information and outputs a code length signal 151 indicating the code length of an individual code produced from the DCT coefficient data 9 by referring to the variable length code table 7.

The encoder 103 receives the DCT coefficient data 13 after inserting the information from the information inserting section 1. The encoder 103, while referring to the variable length code table 7, outputs a code length signal 153 indicating the code length of an individual code produced from the DCT coefficient data 13, a run length signal 155 indicating the run length corresponding to the individual code, a level signal 157 indicating the level of the non-zero coefficient corresponding to the individual code, and a position signal 159 indicating the position of the non-zero coefficient.

The total code length calculation section 105 receives the code length signal 151 from the code length reference section 101 and calculates a total code length signal 161 indicating the total code length for each block of the DCT coefficient data 9 before inserting the information.

The total code length calculation section 107 receives the code length signal 153 from the encoder 103 and calculates a total code length signal 163 indicating the total code length for each block of the DCT coefficient data 13 after inserting the information.

The total code length difference calculation section 109 receives the respective total code length signals 161 and 163 from the total code length calculation sections 105 and 107. The total code length difference calculation section 109 calculates a total code length difference signal 165 indicating a difference between the per-block total code length before inserting the information and the per-block total code length after inserting the information.

The code length target value calculation section 111 receives the code length signal 153 and the total code length difference signal 165 and calculates a code length target signal 167 indicating a code length target value by subtracting the difference indicated by the total code length difference signal 165 from the code length indicated by the code length signal 153.

The level range calculation section 113 receives the level signal 157 and the position signal 159 from the encoder 103 and outputs a level range signal 169 indicating minimum and maximum values of a level variation range that does not produce any deterioration in the quality of an image.

The level reference section 201 receives the run length signal 155 and the code length target signal 167 and outputs a target level signal 251 indicating the target level corresponding to a combination of the run length indicated by the signal 155 and the code length target value indicated by the signal 167. If there is a plurality of target level candidates, a minimum level, maximum level or intermediate level of those target level candidates is used as the target level.

The level comparator 301 receives the level range signal 169 and the target level signal 251 and compares the target level with a maximum value and minimum value of the level variation range. The level comparator 301 outputs a selection signal 351 that changes according to the comparison result.

The selector 303 receives the level range signal 169, the target level signal 251, and the selection signal 351 and outputs a signal 353 according to the selection signal 351. If the target level is greater than a maximum value of the level variation range, the signal 353 is a signal indicating the maximum value of the level variation range. If the target level is smaller than a minimum value of the level variation range, the signal 353 is a signal indicating the minimum value of the level variation range. In other cases, the signal 353 is a signal indicating the target level.

The code length reference section 203 receives the run length signal 155 and the signal 353 and outputs a code length signal 355 indicating the code length of a code corresponding to a combination of the run length indicated by the signal 155 and the level indicated by the signal 355 with reference to the variable length code table 7.

The code length comparator 215 receives the code length target signal 167 and the code length signal 355 and compares the code length target value indicated by the signal 167 with the code length indicated by the signal 355. The code length comparator 215 outputs a write enable signal 357 that becomes active when the code length target value and the code length match. Alternatively, the code length comparator 215 can also compare the code length target value indicated by the signal 167 with the code length indicated by the signal 265 and output a write enable signal 357 that becomes active when the absolute value of the difference between these two is updated.

The memory 123 receives the position signal 159, the signal 353, and the write enable signal 357 and stores the position indicated by the signal 159 and the level indicated by the signal 353 when the write enable signal 357 becomes active. When the above operation for all non-zero coefficients in the block has been completed, the memory 123 outputs a level signal 179 indicating the level after correction and a position signal 181 indicating the position of the corrected non-zero coefficient.

The DCT coefficient correction section 125 receives the DCT coefficient data 13, the level signal 179, and the position signal 181. The DCT coefficient correction section 125 corrects the level of the DCT coefficient located at the position indicated by the position signal 181 among the DCT coefficients 13 to the level indicated by the level signal 179. Therefore, the DCT coefficient correction section 125 outputs restored DCT coefficient data 17 indicating all DCT coefficients about the block, that is, all DCT coefficients after the total code length has been restored.

When no match is found by the code length comparator 215, it is also possible to make a retry by broadening the level variation range determined by the level range calculation section 113. It is also possible to output an error signal without making any retry. However, some applications require neither retry nor error signal.

The above-described embodiments have been explained taking the MPEG standard coding system as an example, but of course the present invention is applicable to other image coding systems using DCT, for example. JPEG standard and H.261 as well.

The method according to the above described embodiments can also be implemented by a computer loading and executing from a recording medium such as CD-ROM, a program that instructs the computer to execute this method.

The system according to the above described embodiments can also be implemented by a computer loading and executing from a recording medium such as CD-ROM, a program to make the computer function as the above-described sections of the system.

In this case, normally, a CPU of the computer temporarily transfers the program from the recording medium to the main memory under an operating system, and then loads the program from the main memory and executes the program.

The above described program can also be created from a text-format file in which interpreter format instructions are written and an interpreter that loads this file and converts it to executable instructions.

As described above, according to the present invention, it is possible to eliminate variations in code length that occur when information is inserted. Therefore, a great deal of information is allowed to be inserted into digital image data compression-encoded by the MPEG standard or the like.

What is claimed is:

1. A system for inserting additional information in DCT (discrete cosine transform) coefficients by referring to a variable-length code table, wherein the DCT coefficients are generated in blocks from image data, the system comprising:

an information inserting section for inserting additional information into input DCT coefficients in a block by changing at least one DCT coefficient of the input DCT coefficients to produce changed DCT coefficients; and a total code length restoring section for correcting a level of a DCT coefficient selected from the changed DCT coefficients in the block, excluding the at least one changed DCT coefficient, to produce corrected DCT coefficients by referring to the variable-length code table, the DCT coefficient being selected so that a total code length of codes generated from the corrected DCT coefficients is equal to an original total code length of codes generated from the input DCT coefficients in the block, wherein the total code length restoring section comprises:

a difference calculator for calculating a total code length difference between the original total code length and a total code length of codes generated from the changed DCT coefficients in the block;

a target code length calculator for calculating a target code length for a non-zero DCT coefficient sequentially selected from the changed DCT coefficients based on a difference between the total code length difference and a current code length of the non-zero DCT coefficient; and a level corrector for correcting a level of the non-zero DCT coefficient to produce corrected DCT coefficients when a corrected code length of a code generated from a combination of a zero-run length and a corrected level of the non-zero DCT coefficient substantially matches the target code length.

2. The system according to claim 1, wherein the level corrector comprises:

a level candidate calculator for calculating a level candidate of the non-zero DCT coefficient based on a current level of the non-zero DCT coefficient; a determiner for determining whether a corrected code length of a code generated from a combination of a zero-run length and the level candidate of the non-zero DCT coefficient substantially matches the target code length; and a corrector for correcting a level of the nonzero DCT coefficient to the level candidate when the corrected code length matches the target code length.

3. The system according to claim 2, wherein the level candidate calculator comprises:

a level range limiter for limiting a level range of the non-zero DCT coefficient based on the current level of the non-zero DCT coefficient; and a candidate generator for generating a level candidate within the level range.

4. The system according to claim 1, wherein the level corrector comprises:

a level candidate calculator for calculating a level candidate of the non-zero DCT coefficient based on the target code length and a zero-run length of the non-zero DCT coefficient;

a determiner for determining whether a corrected code length of a code generated from a combination of the zero-run length and the level candidate of the non-zero DCT coefficient substantially matches the target code length; and a corrector for correcting a level of the nonzero DCT coefficient to the level candidate when the corrected code length matches the target code length.

5. The system according to claim 4, wherein the level candidate calculator comprises:

a candidate generator for generating a level candidate based on the target code length and a zero-run length of the non-zero DCT coefficient;

a level range limiter for limiting a level range of the non-zero DCT coefficient, wherein the level range is limited by a maximum level and a minimum level; and a level selector for selecting one of the level candidate, the maximum level and the minimum level depending on whether the level candidate falls within the level range.

6. A method for inserting additional information in DCT (discrete cosine transform) coefficients by referring to a variable-length code table, wherein the DCT coefficients are generated in blocks from image data, the method comprising the steps of:

a) inserting additional information into input DCT coefficients in a block by changing at least one DCT coefficient of the input DCT coefficients to produce changed DCT coefficients; and b) correcting a level of a DCT coefficient selected from the changed DCT coefficients in the block, excluding the at least one changed DCT coefficient, to produce corrected DCT coefficients by referring to the variable-length code table, the DCT coefficient being selected so that a total code length of codes generated from the corrected DCT coefficients is equal to an original total code length of codes generated from the input DCT coefficients in the block.

wherein the step (b) comprises the steps of:

b.1) calculating a total code length difference between the original total code length and a total code length of codes generated from the changed DCT coefficients in the block;

b.2) calculating a target code length for a non-zero DCT coefficient sequentially selected from the changed DCT coefficients based on a difference between the total code length difference and a current code length of the non-zero DCT coefficient; and b.3) correcting a level of the non-zero DCT coefficient to produce corrected DCT coefficients when a corrected code length of a code generated from a combination of a zero-run length and a corrected level of the non-zero DCT coefficient substantially matches the target code length.

7. The method according to claim 6, wherein the step (b.3) comprises the steps of:

b.3.1) calculating a level candidate of the non-zero DCT coefficient based on a current level of the non-zero DCT coefficient;

b.3.2) determining whether a corrected code length of a code generated from a combination of a zero-run length and the level candidate of the non-zero DCT coefficient substantially matches the target code length; and b.3.3) correcting a level of the non-zero DCT coefficient to the level candidate when the corrected code length matches the target code length.

8. The method according to claim 7, wherein the step (b.3.1) comprises the steps of:

a level range limiter for limiting a level range of the non-zero DCT coefficient based on the current level of the non-zero DCT coefficient; and a candidate generator for generating a level candidate within the level range.

9. The method according to claim 6, wherein the step (b.3) comprises the steps of:

b.3.1) calculating a level candidate of the non-zero DCT coefficient based on the target code length and a zero-run length of the non-zero DCT coefficient;

b.3.2) determining whether a corrected code length of a code generated from a combination of the zero-run length and the level candidate of the non-zero DCT coefficient substantially matches the target code length; and b.3.3) correcting a level of the non-zero DCT coefficient to the level candidate when the corrected code length matches the target code length.

10. The method according to claim 9, wherein the step (b.3.1) comprises the steps of:

generating a level candidate based on the target code length and a zero-run length of the non-zero DCT coefficient;

limiting a level range of the non-zero DCT coefficient, wherein the level range is limited by a maximum level and a minimum level; and selecting one of the level candidate, the maximum level and the minimum level depending on whether the level candidate falls within the level range.

* * * * *